United States Patent
Tsurunaga et al.

[11] Patent Number: 6,097,246
[45] Date of Patent: Aug. 1, 2000

[54] CURRENT LIMITING BREAKING DEVICE USING ELECTROMAGNETIC REPULSION COIL

[75] Inventors: Kazuyuki Tsurunaga; Jun Matsuzaki; Hiroshi Ohashi; Hideki Hachiya, all of Tokyo, Japan

[73] Assignee: Kabushiki Kaisha Toshiba, Kawasaki, Japan

[21] Appl. No.: 09/069,164

[22] Filed: Apr. 29, 1998

[30] Foreign Application Priority Data

Apr. 30, 1997 [JP] Japan ..................................... 9-112791
Nov. 14, 1997 [JP] Japan ..................................... 9-313706

[51] Int. Cl.⁷ ..................................................... H01J 19/82
[52] U.S. Cl. .......................... 327/599; 335/177; 335/183; 361/5; 361/120
[58] Field of Search .................... 327/538, 599; 361/2, 3, 5, 102, 93, 95, 120; 335/177, 183

[56] References Cited

U.S. PATENT DOCUMENTS 5,379,014   1/1995   Sato et al. ............................... 335/177
5,510,946   4/1996   Franklin .................................. 361/102

*Primary Examiner*—Jung Ho Kim
*Attorney, Agent, or Firm*—Finnegan, Henderson, Farabow, Garrett & Dunner, L.L.P.

[57] ABSTRACT

The present invention includes a first switch 4a, a second switch 4b and a capacitor 4d. The first switch 4a normally in a closed state is connected in series between a power source 1 and load, and opens when an accident builds up. The second switch 4b normally in an open state closes almost simultaneously with the opening of the first switch 4a. The capacity 4d normally charged by an arbitrary voltage has predetermined electrically capacity. The serial connected circuit consists of the second switch 4b and capacitor 4d, it is connected in parallel to the first switch 4a.

5 Claims, 14 Drawing Sheets

STEADY STATE LOAD CURRENT

SHORT CIRCUIT CURRENT

STEADY STATE LOAD CURRENT

SHORT CIRCUIT CURRENT

CURRENT LIMITING BREAKING DEVICE USING ELECTROMAGNETIC REPULSION COIL

BACKGROUND OF THE INVENTION

1. Field of the Invention

The present invention relates to a current limiting breaking device applicable to high voltage, heavy current electric circuits.

2. Description of the Related Art

When a short circuit or a grounding accident occurs on a circuit, several tens of kA accident electric current flow, causing severe damage to the power system and electric power apparatus. Technology which instantaneously detects and suppresses this kind of accident electric current is termed current limiting technology and up to now, devices based on various principles have been developed. FIG. 1 and FIG. 2 show the representative, conventional technology of the construction and application circuits of these current limiting breaking devices. (Japanese Examined Patent Publication (Tokkoushou) No. 50-4876). In the application circuits of FIG. 1, E is 3-phase electric power source, R and X are resistance and inductance provided on the short circuit, B is a breaking device and RG is a current limiting component. In this conventional technology, a PTC (Positive Temperature Coefficient) resistor consisting of niobium carbide is used as current limiting component RG, and the accident electric current is current limited utilizing the special characteristics of the FTC. As shown in FIG. 2, niobium carbide has the special PTC characteristic of its inherent resistance which changes considerably in response to rises in temperature. Therefore, with normal electrical current values, as the inherent resistance of the current limiting component RG is small, the calorific value is also small and the temperature of the current limiting component RG does rot rise, maintaining a low resistance state and does not affect the circuit. However, the heat generated in the current limiting component RG increases rapidly and the component temperature rises, when an accident occurs and an excessive electric current flows. As a result, the inherent resistance of the current limiting component RG increases and acts by reducing the circuit current. By means of this type of current limiting operation, as the accident electric current is suppressed to a large extent, it becomes possible to miniaturize the breaker device and reduce damage to the power system caused by accident electric current.

As in the above, by constructing conventional current limiting breaking devices so that the current limiting component and the breaker are in series, in response to excess currents such as a short circuit with sharp build ups, while they have the superior characteristic of being able to limit the current from the first wave, as the width of variation of the inherent resistance is comparatively small, the following areas requiring resolution remain.

(1) As a constant load current flows always through the current limiting component, the current carrying capacity is restricted. Namely, as the temperature of the current limiting component rises proportional to the load current, it is necessary to control the steady temperature of the current limiting component (current carrying current valve) to the extent that it does not have an effect on the circuit and the current limiting characteristics.

(2) As a constant load current flows through the current limiting component, Joule heating (power loss) occurs due to the steady current carrying current.

(3) Under actual conditions, the practicable width of the inherent resistance variation of current limiting components under normal temperatures is approximately 1:10. Therefore, as in a conventional construction where the current limiting component is connected in series between the power source and the load, the higher the voltage of the applicable circuit becomes, the lower the current limiting effectiveness. Namely, the necessary resistance value (Rm) of the current limiting component when current limiting is $$Rm = E/Im \ (\Omega) \tag{1}$$

Here, E is the Circuit Voltage (V), and Im is the current limiting current value (A). A current limiting component resistance value (Ro) when not energizing, is $1/10$ of (Rm), Ro=Rm/10. Therefore, the continuous current carrying current allowable value I is $$I = [\alpha \cdot \theta t / \{Ro(1+\beta \cdot \theta t)\}]^{1/2} \ (A) \tag{2}$$

Here, $\alpha$ is the heat loss coefficient (W/K) of the current limiting component, $\beta$ is the resistance temperature coefficient of the current limiting component and $\theta t$ is the allowable temperature rise value (K) when current limiting component is in a steady state.

As can be understood from the above results, in the case where the current limiting current value (Im) is constant, when circuit voltage (E) increases, it becomes necessary for the resistance value (Rm) of the current limiting component when limiting a current to be correspondingly large, and the steady resistance value (Ro) increases. The heat loss coefficient ($\alpha$) of the current limiting component and the steady allowable temperature rise value ($\theta t$) is determined by the external shape and the characteristics of the current limiting component. However, if this is constant, the larger the steady resistance value when steady (Ro) of the current limiting component, the lower the continuous current carrying current allowable value (I) becomes. Conversely, if the steady resistance value of the current limiting component is determined with preference to the current carrying current value, as the resistance value of the current limiting component when current limiting will only rise by a factor of 10, the current limiting current value will of necessity rise in conjunction with the rise in circuit voltage and the current limiting effectiveness will decrease.

SUMMARY OF THE INVENTION

Accordingly, one object of the present invention is to provide a novel current limiting breaking device which is able to provide a large current limiting effect and is able to reduce steady loss, and in addition to being applicable to high voltage heavy current circuits is compact and low cost.

The above object of the present invention can be achieved by a current limiting breaking device which satisfies the following structural requirements.

That is to say, an essential point is a current limiting breaking device connected between the power source and the load which detects the build up of an accident current and limits and interrupts the current before the aforementioned current rises, and a first switch normally held in a closed state and connected in series between the aforementioned power source and load and which opens when the accidental current builds up, and a second switch normally held in an open position which is closed controlled almost simultaneously with the opening of the aforementioned first switch and a series connected circuit with a predetermined capacitance capacitor normally charged by a random voltage connected in parallel to the aforementioned first switch. By this construction, for example, an accident current build up is swiftly detected by an excess current detection device, the first switch opens before the accident current exceeds a predetermined capacity and the second switch is closed almost simultaneously. When the second switch is closed a resonance current with a frequency corresponding to the capacity of the residual inductance and capacitor of the circuit of the first switch flows, superimposing on the accident current flowing in the first switch. As the frequency of the resonance current from the capacitor is extremely high in terms of the frequency of the accident current, within a short period of time, a current zero point in the first switch occurs and the accident is current interrupted. As a result, the accident current commutates to the capacitor side, and current limiting is carried out to the required value by the impedance of the capacitor. Also, since the current limiting component capacitor is connected in series to the second switch, and as it is connected in parallel to the first switch, steady loss due to the current limiting component does not occur.

The above object of the present invention can be achieved by a current limiting breaking device which satisfies the following structural requirements.

That is to say, an essential point is to make the aforementioned first switch and the aforementioned second switch a vacuum valve. By this construction, the application to high voltage and heavy current circuits becomes straightforward. By making the first switch a vacuum valve, even when the switch opens, no change occurs in the circuit current until the current zero point comes, however, as described above, the second switch is closed almost simultaneously with the opening of the first switch, and as an extremely high frequency resonance current flows in terms of the accident current frequency of the circuit of the first switch to forcibly produce a current zero point, the first switch turns OFF within a short space time. As a result, the accident current on the first switch side interrupts, commutates to the capacitor side and the current limited.

Also, the above object of the present invention can be achieved by a current limiting breaking device which satisfies the following structural requirements.

That is to say, an essential point is to make the aforementioned first switch a vacuum valve and make the aforementioned second switch an air break switch. By this construction, even if the current limited current flowing second switch is an air break switch, the second switch is controlled to close almost simultaneously with the opening of the first switch, making it possible for the current to be limited before the accident current becomes excessive.

Yet furthermore, the above object of the present invention can be achieved by a current limiting breaking device which satisfies the following structural requirements.

That is to say, an essential point is to make the aforementioned first switch a vacuum valve and the aforementioned second switch a trigger gap. By this construction, when the current limited current flowing second switch is made an extremely quickly responding trigger gap, following the opening of the first switch, the second switch is closed all the more quickly, making it possible for the accident current to be current limited to a predetermined value within a shorter time period.

Also, the above object of the present invention can be achieved by a current limiting breaking device which satisfied the following structural requirements.

The current limiting breaking device is in series connected between the power source and the load for the purpose of current limiting and interrupting accident currents, and contains a fixed electrode and a movable electrode connected between the aforementioned power source and load, and also a vacuum valve containing a control electrode located at a distance necessary for insulation near the aforementioned movable electrode, and provided in the arc suppressing closed circuit extending from the control electrode of the aforementioned vacuum valve to the aforementioned fixed electrode and is provided with a capacitor charged with random voltage and an arc suppressing reactor connected in series to the aforementioned capacitor in the aforementioned arc suppressing closed circuit.

By doing this when the fixed electrode and the movable electrode of the vacuum valve separate, and an arc occurs between both electrodes, the insulation level within the vacuum is reduced by the arc, and for example, an arc extinguishing closed circuit consisting of a capacitor→arc extinguishing reactor→control electrode→movable electrode→fixed electrode-capacitor is formed, and a discharge current from the capacitor flows through this arc extinguishing closed circuit.

This discharge current is also an LC resonance current of the capacitor and the arc extinguishing reactor, and as the wave height value and the frequency is larger than the short circuit current during an accident, the current flowing between the fixed electrode and the movable electrode is instantaneously reduced to current zero point and in this way the arc extinguished.

In this way, a large current limiting effect is obtained by the compound impedance of the capacitor and the arc extinguishing reactor after the vacuum valve is in an off state, also, by making the vacuum valve the basic component, it is possible to reduce steady loss caused by the current limiting component and enables application to high voltage and heavy current circuits and also, as it does not employ the method of providing extra current limiting components, it has been possible to achieve compactness and cost reductions.

The above object of the present invention can be achieved by a current limiting breaking device which satisfies the following structural requirements.

That is to say, a current limiting breaking device is in series connected between the power source and the load for the purpose of limiting the current and interrupting accidental currents, and contains a fixed electrode and a movable electrode connected between the aforementioned power source and load, and also, a vacuum valve containing a control electrode located at a distance necessary for insulation near the aforementioned movable electrode is provided in the arc extinguishing closed circuit.

This current limiting breaking device, is provided with a fixed electrode and a movable electrode in an arrangement relatively inverse in regard to the aforementioned invention.

Also, the above object of the present invention can be achieved by a current limiting breaking device which satisfies the following structural requirements.

That is to say, in the current limiting breaking device, the aforementioned vacuum valve is provided with an electromagnetic repulsion coil which by excitation produces a magnetic field in the direction in which the aforementioned movable electrode separates from the fixed electrode, and a thyristor switch connected in series to the said capacitor in the separating closed circuit extending from one end of the aforementioned electromagnetic repulsion coil via the said capacitor to the other end of the said electromagnetic repulsion coil, and a separating reactor connected in series to the aforementioned capacitor in the aforementioned separating closed circuit, and an excess current detection apparatus which detects currents flowing between the aforementioned power source and load, and if the detection results exceed a predetermined value, instantly turns ON the aforementioned thyristor switch for a predetermined time.

By doing this, the excess current detection apparatus, detects the current flowing between the power source and load, and if the detection results exceed a predetermined value, turns ON a thyristor switch for a predetermined time. When the thyristor switch is in the ON state, an LC resonance current flows in the separating closed circuit from one end of the electromagnetic repulsion coil via the capacitor and the separating reactor to the other end of the electromagnetic repulsion coil. The electromagnetic repulsion coil produces a magnetic field by excitation from the LC resonance current in the direction the movable electrode is separated from the fixed electrode, as the movable electrode separates from the fixed electrode, in addition to the corresponding action of the aforementioned invention, it is possible to mutually separate the movable electrode and the fixed electrode easily, quickly and with certainty.

Furthermore, the above object of the present invention can be achieved by a current limiting breaking device which satisfies the following structural requirements.

That is to say, the aforementioned vacuum valve when in an open state mechanically makes contact with the aforementioned movable electrode and the aforementioned control electrode. By doing this, as the vacuum valve when in an open state mechanically makes contact with the movable electrode and the control electrode, in addition to the corresponding action of the aforementioned invention, the movable electrode is able to superimpose a high frequency current on to the short circuit current only at a predetermined point distant from the fixed electrode.

Yet furthermore, the above object of the present invention can be achieved by a current limiting breaking device which satisfies the following structural requirements.

That is to say, in the current limiting breaking device, the aforementioned vacuum valve when moving from a closed circuit state to an open state, the aforementioned movable electrode and the aforementioned control electrode separate after making contact for an instant.

By doing this, as for the vacuum valve, when moving from a closed circuit state to an open state, the movable electrode and the control electrode separate after making contact for an instant, in addition to the corresponding action of the aforementioned invention, the short circuit current is commutated to the capacitor side by the instantaneous contact of the movable electrode and the control electrode, and the arc current between the fixed electrode and the movable electrode is interrupted, and following this, when the control electrode and the movable electrode separate, an arc occurs by the commutated short circuit current between the control electrode and the movable electrode, however, as current zero point occurs due to oscillation of the circuit current, it is possible to create an interrupted state in the vacuum valve.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
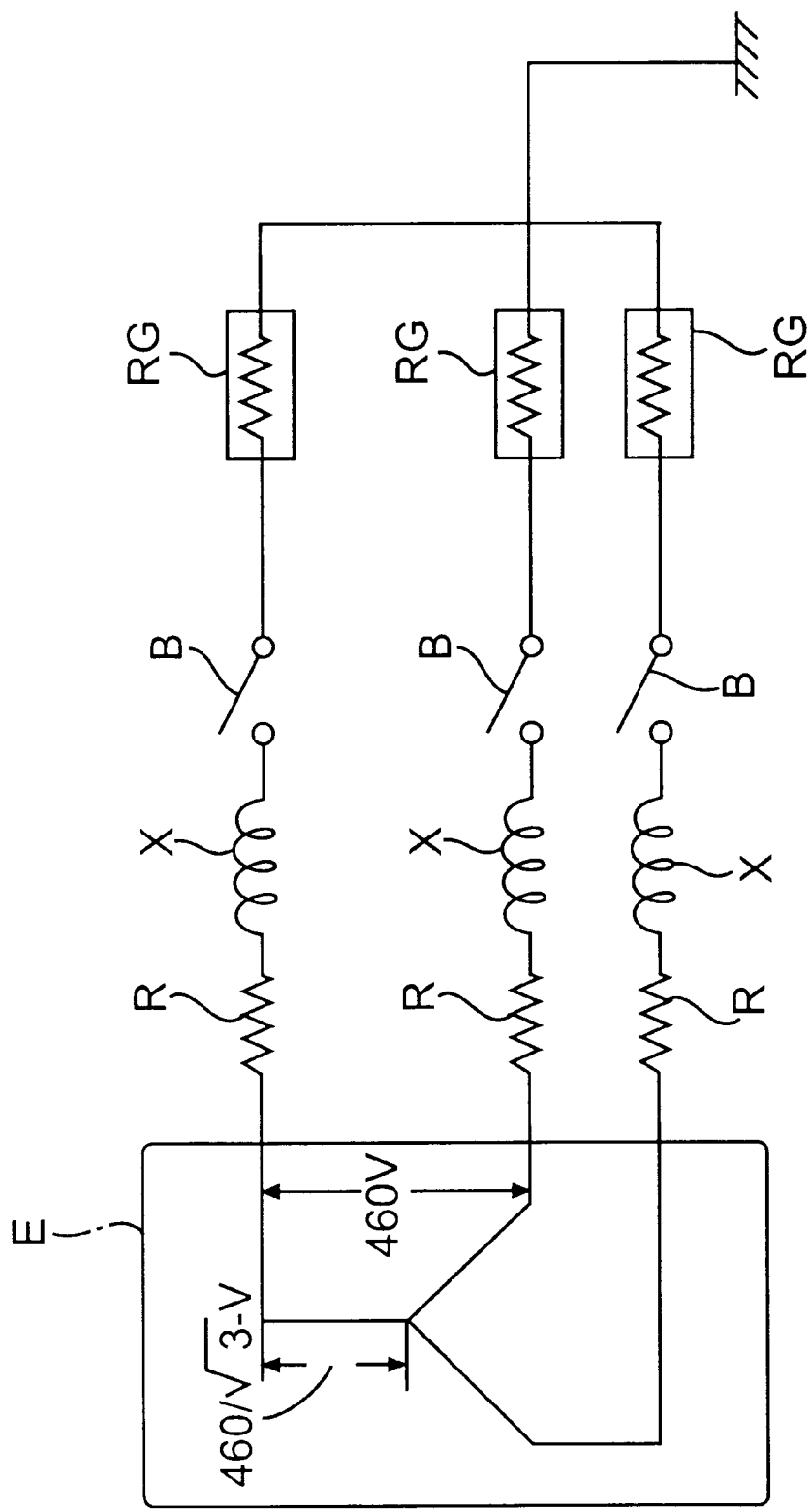
FIG. 1 is a circuit diagram of a conventional current limiting breaking device.
Figure 2:
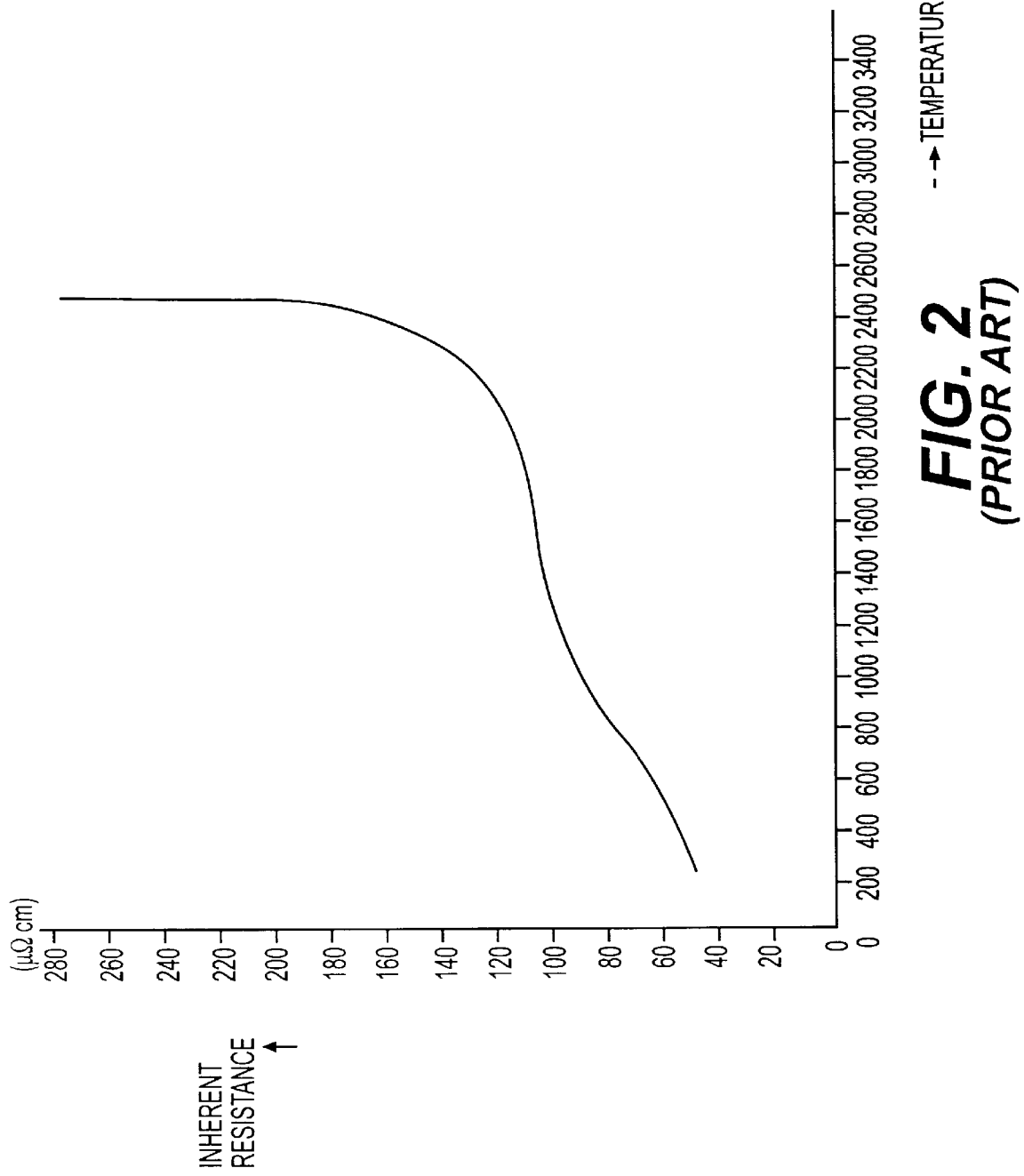
FIG. 2 is an illustration showing the characteristics of the temperature dependency of the intrinsic resistance of the current limiting component in the aforementioned current limiting breaking device.

Referring now to the drawings, wherein like reference numerals designate identical or corresponding parts throughout the several views, and more particularly to FIG. 3 thereof, one embodiment of the present invention will be described.

Figure 3:
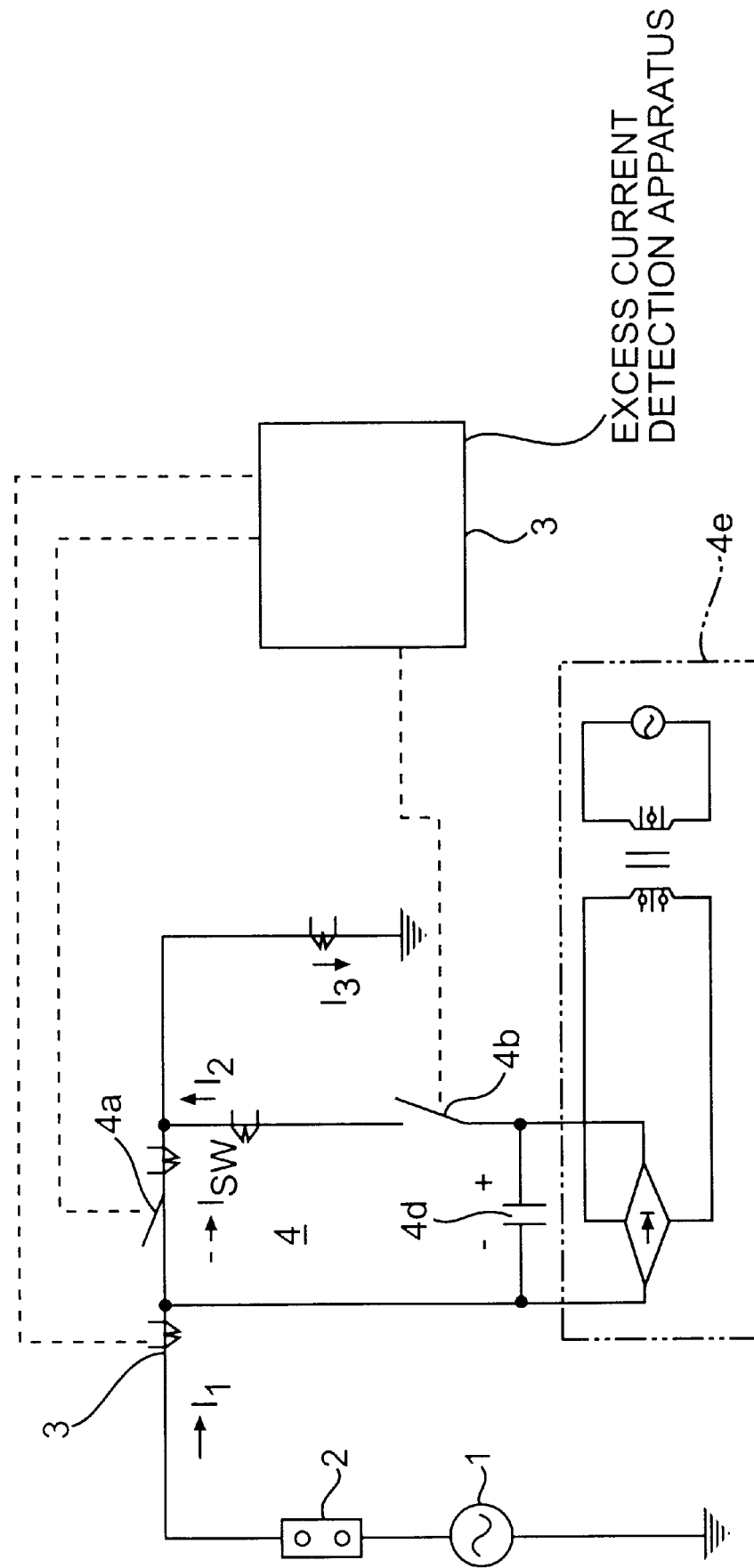
FIG. 3 is a circuit diagram showing a first embodiment of the current limiting breaking device concerning the present invention.
Figure 5A:
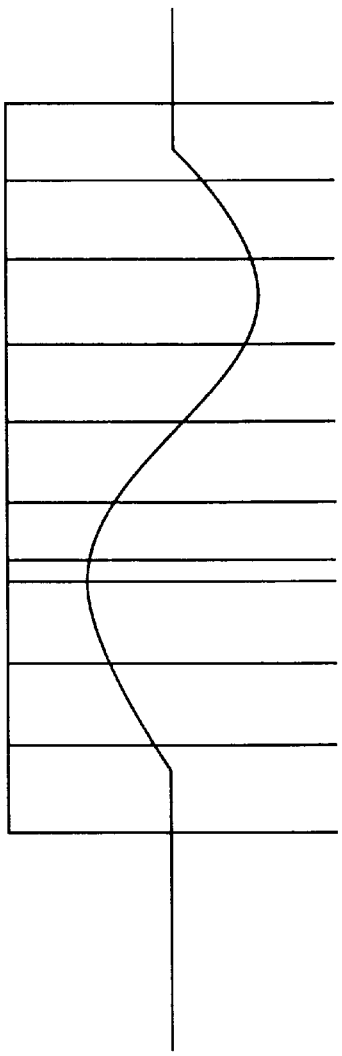
FIG. 5 is a timing chart showing the performance test results of the aforementioned first embodiment of the current limiting test circuit in FIG. 4.
Figure 5B:
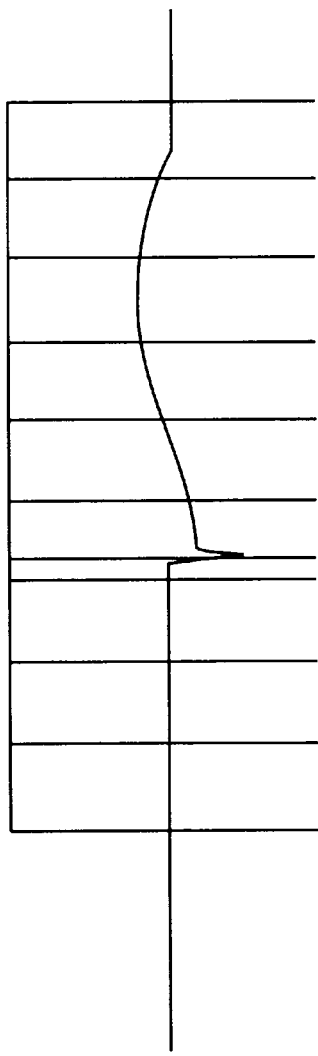
Figure 5C:
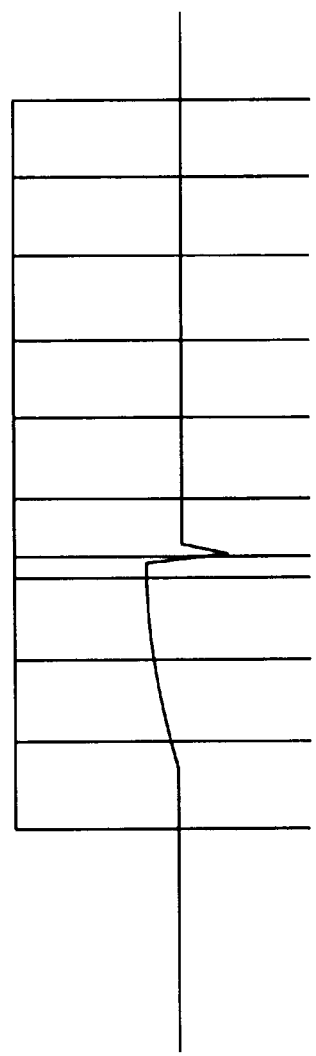

FIG. 3 through to FIG. 5 are diagrams showing the first embodiment of the present invention. Firstly, an explanation will be given using FIG. 3 for the construction and operation of the current limiting breaking device. In the same diagram, 1 is a power source, 2 is a breaker device, 3 is an excess current detection apparatus( or an over current detection apparatus is sometimes used technically), 4 is a current limiting breaking device. The current limiting breaking device 4 is constructed from first switch 4a connected in series between power source 1 and the load, and a series connected circuit connected in parallel to the first switch 4a connected in series to a second switch 4b and a current limiting component capacitor 4d, and charging apparatus 4e which constantly charges capacitor 4d with a random voltage. The first switch 4a and the second switch 4b both utilize a vacuum valve suited to the opening and closing of high voltage and heavy currents, first switch 4a and second switch 4b are provided with an operational device, abbreviated from the diagrams, which drive each switch.

The current limiting breaking device is constructed as above, and operates as follows. Namely, excess current detection apparatus 3 quickly detects and discriminates an accident current occurring in the circuit, the first switch 4a opens before the accident current rises and second switch 4b closes at the same time as the first switch 4a opens. Capacitor 4d is charged by a constant predetermined voltage by charging apparatus 4e, and when the second switch 4b closes an LC resonance current of a frequency corresponding to the residual inductance is run through the circuit of the first switch 4a, superimposing onto the accident current flowing through the first switch 4a. As the resonance current frequency from capacitor 4d is extremely high in relation to the accident current frequency, within a short time, current zero point occurs in the first switch 4a and the accident current is interrupted. As a result, the accident current commutates to capacitor 4d side and its current is limited by the impedance of capacitor 4d.

Figure 4:
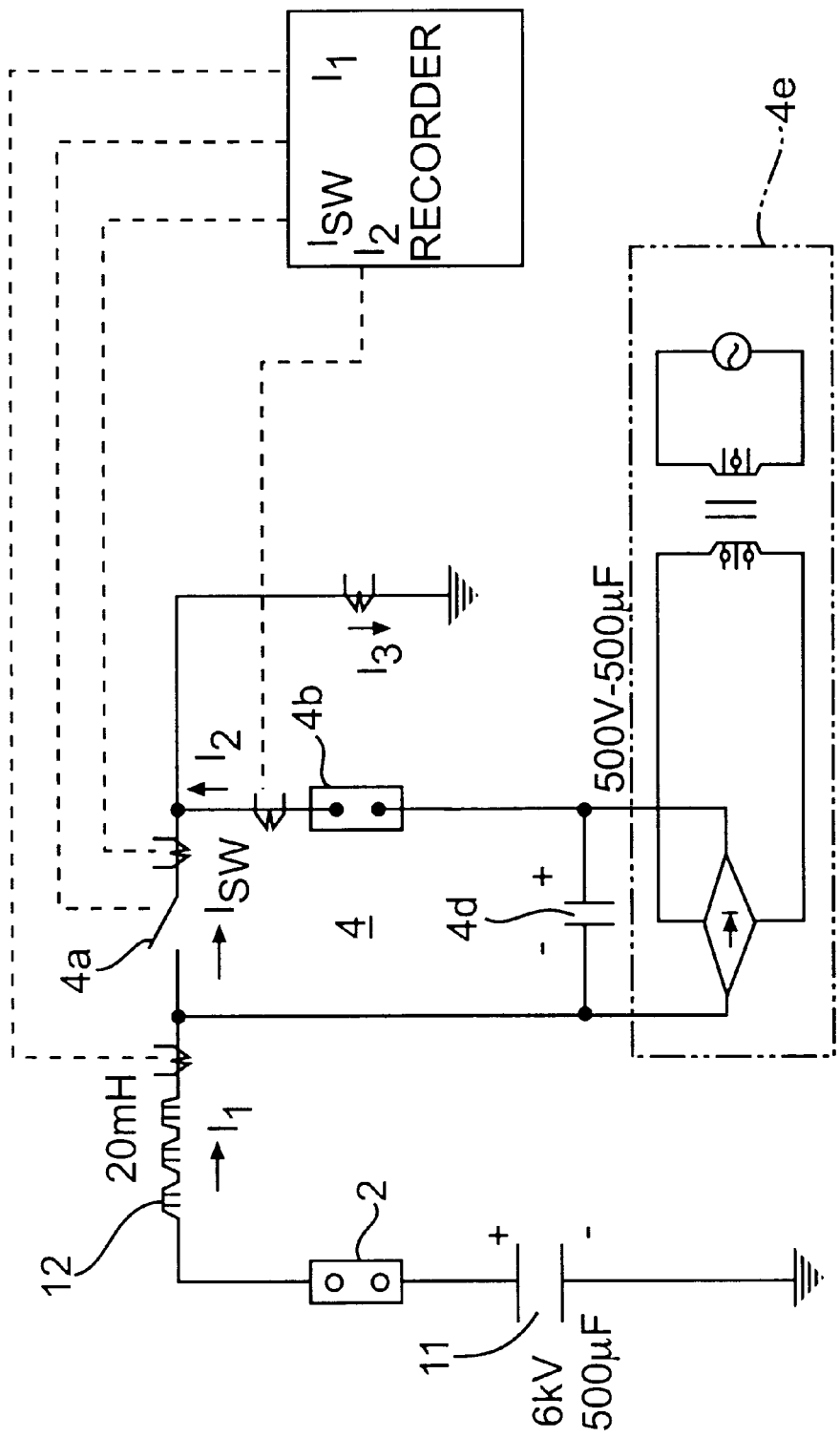
FIG. 4 is a circuit diagram showing the current limiting test circuit of the aforementioned first embodiment.

Next, a more detailed explanation of the action of the above mentioned current limiting breaking device is given using the current limiting test circuit of FIG. 4.

In FIG. 4, in place of power source 1 capacitor 11 and reactor 12 are used making a 6 kV-50 Hz AC power source. Namely, capacitor 11 capacity is set at 500 μF, the inductance of reactor 12 at 20 mH, power source resonance frequency is 50 Hz and the LC serial circuit surge impedance is 6.3 Ω.

Therefore, in the circuit of FIG. 4, when breaker apparatus 2 inputs and the first switch 4a closes, a 952 A current, the 6000 V charging voltage of power source capacitor 11 divided by surge impedance 6.3Ω flows into the circuit. Also, the capacity of current limiting capacitor 4d is 500 μF, and is charged by 500V voltage. In the current limiting test circuit of FIG. 4, firstly, after closing the first switch 4a, breaker apparatus 2 is closed and a 952A peak short circuit current run. The instant this short circuit current peaks, second switch 4b is closed and the current limiting breaking action of the aforementioned current limiting breaking device confirmed.

FIG. 5 is an oscillogram showing an example of the operation characteristics of the current limiting breaking in the circuit of FIG. 4. In the same diagram, $I_1$ is the circuit total current, $I_2$ is the current flowing in the second switch 4b and Isw is the current flowing in the first switch 4a. As can be understood from FIG. 5, the first switch 4a is opened at the point in time when breaker apparatus 2 is closed and the first wave peak of the short circuit current has run, almost simultaneously the second switch 4b is closed. As the first switch 4a is a vacuum valve, even when the first switch 4a is opened, until the current zero point comes, change does not occur in circuit current $I_1$. However, due to the closing of the second switch 4b, a high frequency current flows superimposed from capacitor 4d to the first switch 4a, and a current zero point is forcibly produced. Therefore, the short circuit current flowing through first switch 4a is interrupted and commutated to the parallel circuit capacitor 4d and the second switch 4b side. As capacitor 4d has a 1/jwc (6.4Ω) impedance in regard to the 50 Hz AC, the short circuit current is limited according to the impedance. In this way, the current limited short circuit current is interrupted by the breaker apparatus 2. Furthermore, in this embodiment in both the first switch 4a and the second switch 4b a vacuum valve has been used, however only the first switch 4a through which flows the total circuit current need be a vacuum valve, and an air break switch can be used in the second switch 4b through which flows the limited current. When an air break switch is used, an operating device is not required.

According to the current limiting breaking device of the aforesaid embodiment, as it is possible to limit the current and interrupt the current before the accident current rises, power apparatus can be used without requiring consideration of the effects of an accident current. Therefore, in addition to preventing the deterioration of power apparatus, it is possible to make economic selections regarding size and cost factors.

Figure 6:
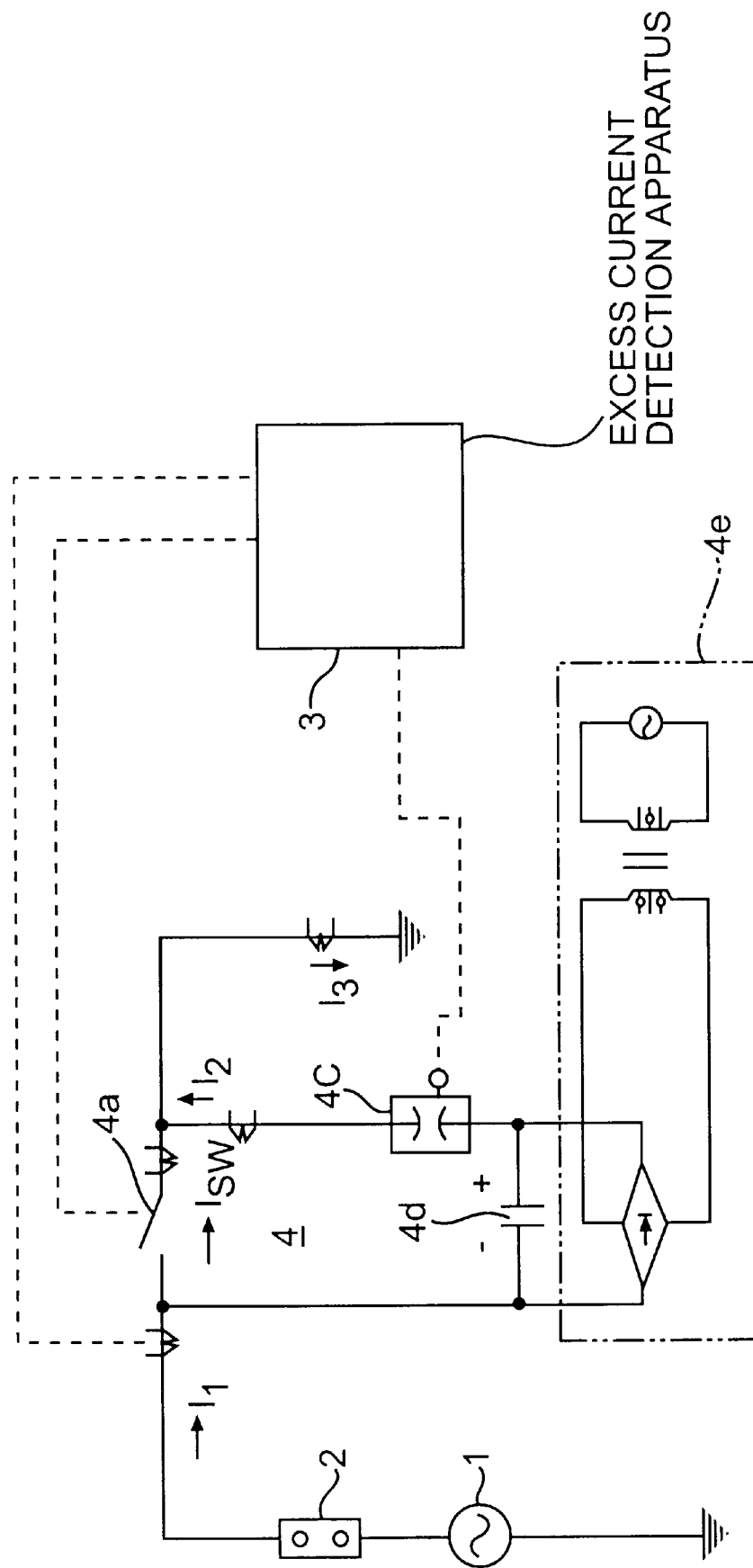
FIG. 6 is a circuit diagram showing a second embodiment of the present invention.

FIG. 6 shows a second embodiment. In this embodiment, the second switch 4c is not a vacuum valve, but has been changed to a trigger gap. Trigger gaps are switches which conduct between terminals by applying a predescribed voltage to the control terminal, and unlike vacuum valves, as they do not require an operating device for ON control and their response is extremely fast, they are highly effective in regard to currents with large di/dt values such as short circuit currents. Therefore, by turning the trigger gap ON immediately after the first switch 4a has opened, the current of :he first switch is interrupted, and the instant the interruption occurs the accident current is commutated to the capacitor 4d side, and the current limited by the impedance of capacitor 4d.

Figure 7:
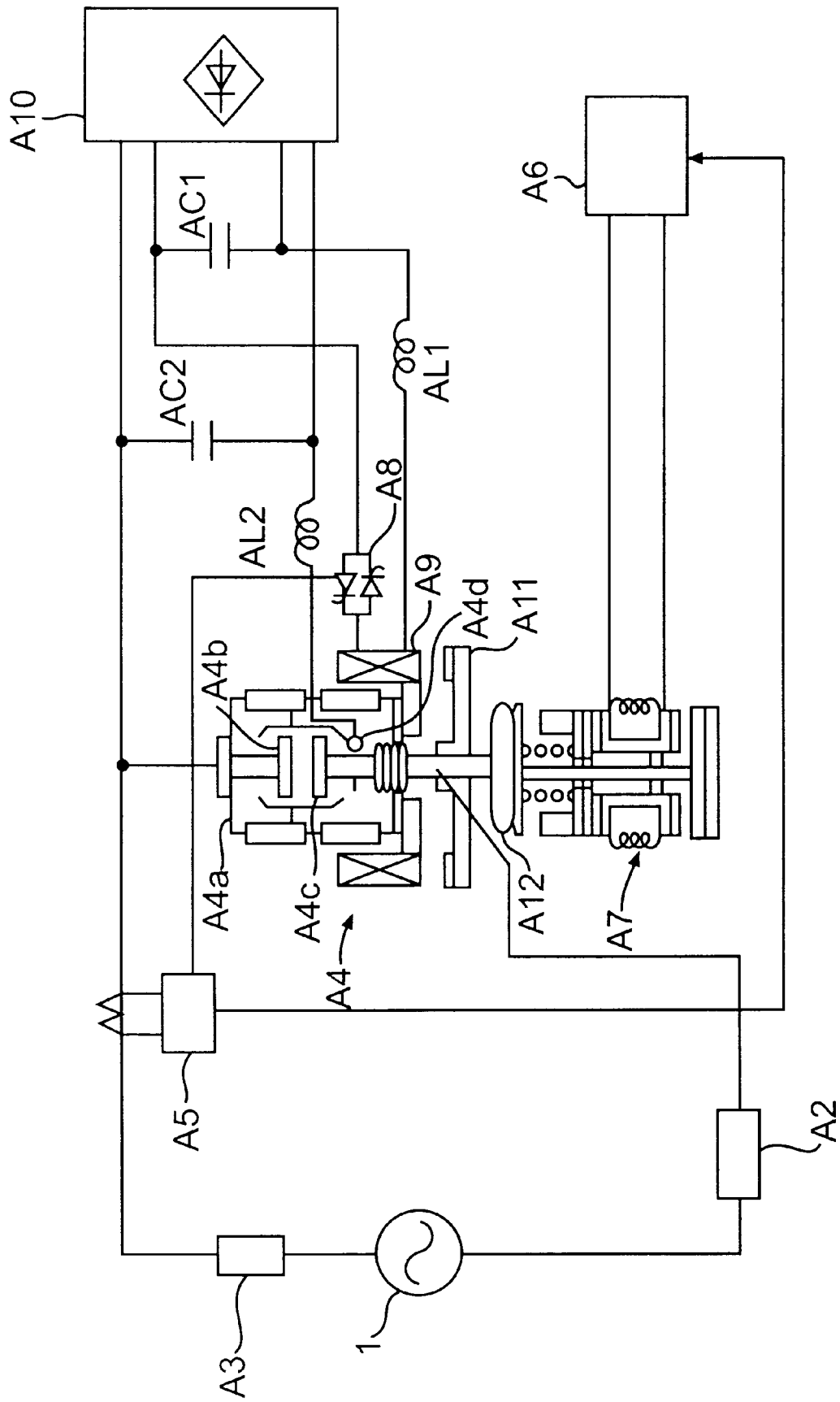
FIG. 7 is a block diagram showing the construction of the high voltage heavy current circuit applied to the current limiting breaking device relating to a third embodiment of the current limiting breaking device relating to the present invention.

Next, FIG. 7 is a block diagram showing the construction of a heavy current high voltage circuit applied to a current limiting breaking device concerning the third embodiment of the present invention. In this circuit breaking apparatus A3 and the current limiting breaking device are connected in series between power source 1 and load A2. Here, power source 1 is an AC power source, using for example, a rated AC 6600V with 50Hz with an internal impedance of 5%. Furthermore, power source 1 need not be limited to an AC power source and may also be a DC power source.

Load A2 is a resistance load of impedance 11Ω and is constructed so that the steady state current is 600A.

Breaking apparatus A3 interrupts the circuit after the current limiting breaking device has current limited and interrupted the accident current and here, is a vacuum breaking device capable of interrupting the accident current within 2 cycles.

The current limiting breaking device is provided with a vacuum valve A4 connected between breaking apparatus A3 and load A2, an excess current detection apparatus A5 to operate the ON/OFF of this vacuum valve A4, control unit A6 and operating device A7 to perform the ON operation of the vacuum valve A4 based on the commands from this excess current detection apparatus A5, a first capacitor AC1 having a thyristor switch A8 which performs the OFF operation of the vacuum valve A4 based on the commands from the excess current detection apparatus A5, a first LC serial resonance circuit consisting of a first reactor AL1 and an electromagnetic repulsion coil A9, a second LC serial resonance circuit consisting of a second capacitor AC2 and a second reactor AL2 to perform the OFF operation of the vacuum valve, and charging apparatus A10 to charge the first and second capacitors AC1, AC2.

Excess current detection apparatus A5 is provided with a function to detect and discriminate the presence of accident currents occurring in the circuit from the absolute value or the di/dt value, when an accident current is discriminated, thyristor switch A8 is instantly turned ON, and at the same time is provided with the function of opening the operating device via the control unit AG. In concrete terms, excess current detection apparatus A5 discriminates circuit currents with a wave height value more than 1700A as accident currents and at the same time as instantly sending an ON command to thyristor A8 sends an OFF command to control unit A6.

Vacuum valve A4 is a three pole type, with fixed electrode A4b and movable electrode A4c in the vacuum container A4a, and control electrode A4d arranged near to movable electrode A4c. In concrete terms vacuum valve A4 is provided with fixed electrode A4b electrically connected to breaking apparatus A3 and second capacitor AC2, and arranged facing this fixed electrode A4b, movable electrode A4c is electrically connected to load A2 via a current carrying shaft, and at a predetermined distance from the current carrying shaft of movable electrode A4c and arranged facing the shaft, control electrode A4d is electrically connected to the second reactor AL2, and short ring A11 is fixed to the current carrying shaft of movable electrode A4c and electromagnetic repulsion coil A9 electrically connected to thyristor switch A8 and the first reactor AL1, and by excitation applies a repulsion magnetic field to short ring A11 separating movable electrode A4c from fixed electrode A4b, and insulating flange A12 provided intervening between short ring A11 and operating device A7.

Control electrode A4d is arranged close to the current carrying shaft of movable electrode A4c, and by the diffusion of the arc immediately following the interruption of the current by fixed electrode A4b and movable electrode A4c, when a reduction in insulation occurs inside vacuum container A4a, control electrode A4d electrically conducts movable electrode A4c via the current carrying shaft.

Movable electrode A4c opens by being depressing over 4 mm in a downward direction by approximately 500 μs by the LC resonance current flowing through the electromagnetic repulsion coil A9 by the OFF command from the excess current detection apparatus A5, and is constructed so that it is maintained for a period in an open state by the opening latch of the operating device A7 when open.

Thyristor switch A8 turns ON for a predetermined time after receiving an ON command from excess current detection apparatus A5, and is for the purpose of supplying a first LC resonance current to the electromagnetic repulsion coil A9 via a first LC serial resonance circuit.

Electromagnetic repulsion coil A9 is fixed to vacuum container A4a, and due to the turning of Thyristor switch A8, when the first LC resonance current has run to the closed circuit consisting of self impedance, reactor AL1 and capacitor AC1, a high frequency strong magnetic field is applied in relation to short ring A11. Furthermore, the first LC resonance current has an approximate 4500A wave height value and a frequency of approximately 700 Hz.

Capacitor AC1 is the operating power source of the electromagnetic repulsion coil 9, and is constantly charged by charging device A10 and for example has an electrical capacity of 500 μF and a charging voltage of approximately 2000 volts.

Reactor AL1 is for the purpose of adjusting the resonance frequency of capacitor AC1 and, for example, is a reactor for making the compound inductance of the electromagnetic repulsion coil A9 and the reactor AL1 approximately 100 μH and if desired is able to substitute in the adjustment of the residual inductance of the circuit.

Short ring A11 is for rapidly opening movable electrode A4c and is provided connected firmly to current carrying shaft of movable electrode A4c, and has the function of producing repulsion between electromagnetic repulsion coil A9 and short ring A11 by inducing the current as if shielding the magnetic field generated by electromagnetic repulsion coil A9.

IS Insulation flange A12 is for mechanically combining movable electrode A4c and operating device A7 while electrically insulating both.

Operating device A7 drives movable electrode A4c and carries out the ON/OFF operation of vacuum valve A4 according to signals received from control unit A6, and has a function of maintaining the current carrying shaft of movable electrode A4c in an open (OFF) state by an opening latch not shown in the drawings.

Control unit A6 has an OFF/ON operating function based on the ON/OFF commands of vacuum valve A4 under normal operations, and when reclosing following current limiting and interruption of an accident current has the function of driving the opening latch opening coil (not illustrated) of operating device A7 enabling it to control closing (ON) operations of vacuum valve A4.

Capacitor AC2 is for superimposing a second LC resonance current between the control electrode A4d and the fixed electrode A4b of vacuum valve A4, and has an electric capacity of 1000 μF and is charged with an approximate 2000 v voltage by a charging device.

Reactor AL2 is for adjusting the resonance frequency of capacitor AC2 in the resonance circuit, and for example has an approximate 10 μH inductance value, and according to desire is able to substitute in the adjustment of the residual inductance of the circuit.

The second LC serial resonance circuit is constructed so that, when both ends are short circuited, the second LC resonance current of wave height value 20 kA and 1600 Hz flows through the self closed circuit. Charging device A10 is a device for the purpose of charging capacitor AC1 and AC2 with approximately 2000V respectively and according to desire each of capacitor AC1 and AC2 may be provided as individual units.

Figure 8A:
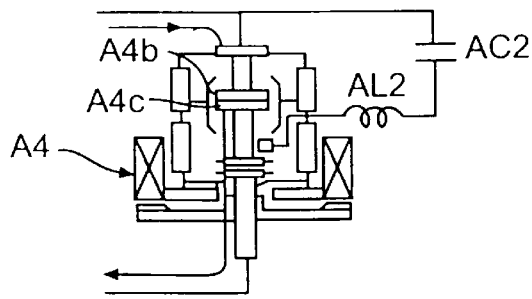
FIG. 8 is a block diagram for the purpose of explaining the operation occurring in the third embodiment.
Figure 8B:
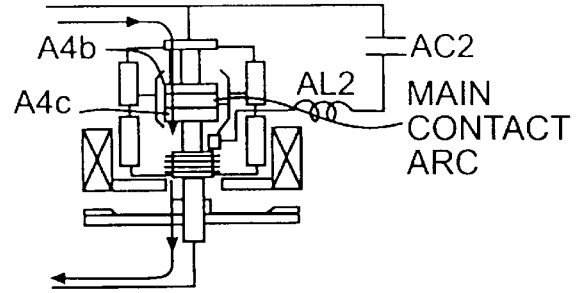
Figure 8C:
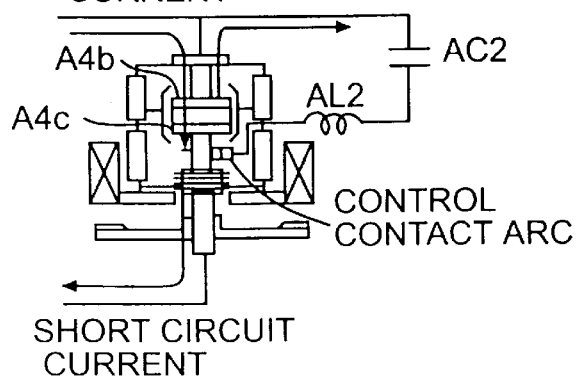
Figure 8D:
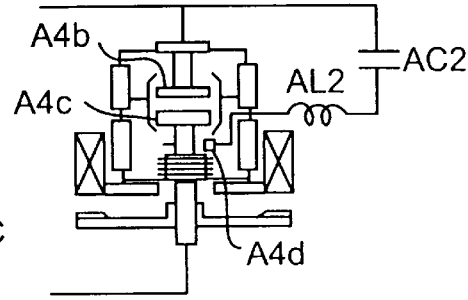
Figure 9:
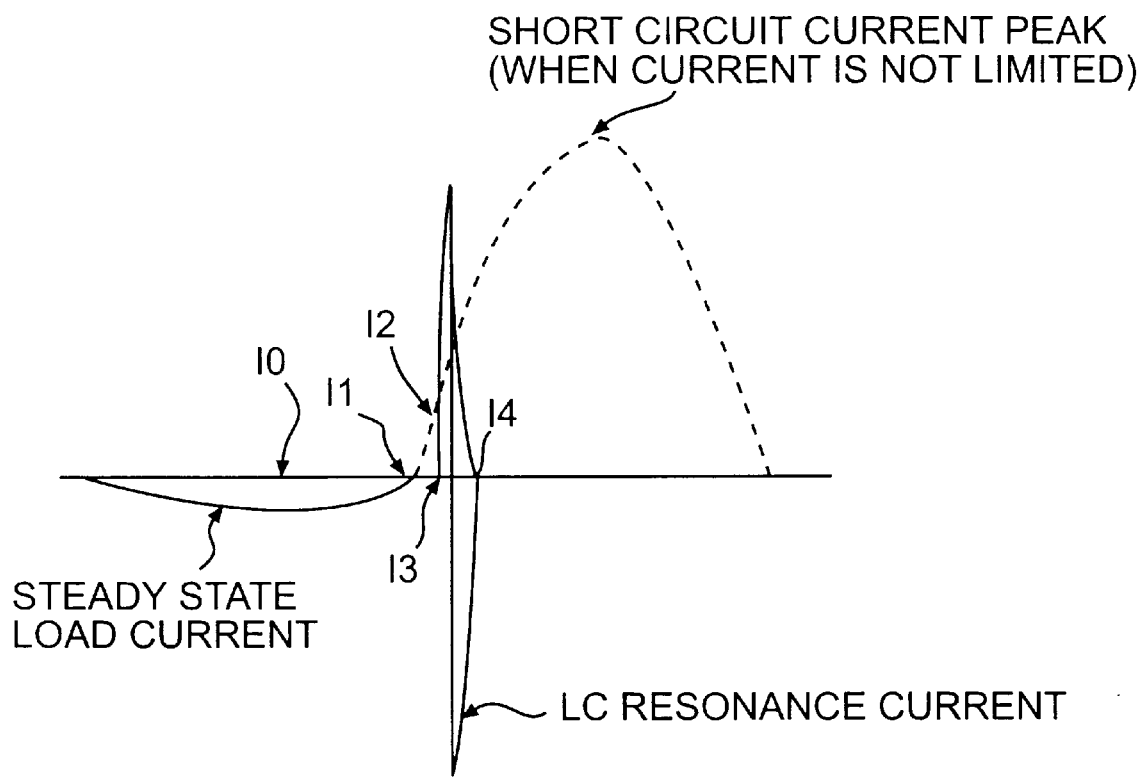
FIG. 9 is a timing chart for the purpose of explaining the operation occurring in the third embodiment.

Next, FIG. 8 and FIG. 9 will be used to explain the operation of the current limiting breaking device constructed as above. During steady time as shown in FIG. 8(a) lovable electrode A4c and fixed electrode A4b of vacuum valve A4 are in an electrically connected state and the impedance of the current limiting breaking device is almost zero, and as shown in FIG. 9, a 600A steady load current is supplied to load A2 from power source 1. Here, a short circuit accident occurs in load A2 and the following concerns the case where a short circuit current flows in the high voltage heavy current circuit. When a short circuit accident occurs in load A2 (time t 1), as shown by the broken line in FIG. 9, the short circuit current attempts to rise to a value approximately 20 times wave height value 17 kA the predetermined current.

Excess current detection apparatus A5 detects short circuit currents when a short circuit current rises to 1700A and at the same time as inputting an ON command to thyristor switch A8, inputs an OFF command to control unit A6 (time t 2).

Thyristor switch A8 is turned ON by this ON command.

By the ON operation of the thyristor switch A8, the first LC resonance current determined by the inductance value of the electromagnetic repulsion coil A9 and reactor AL1 from capacitor C1 flows into electromagnetic repulsion coil A9, this wave height value is 4500A, and the frequency 700 Hz. A strong electromagnetic field is produced in the electromagnetic repulsion coil A9 by this first LC resonance current, and a repulsion force occurs in short ring A11, depressing the current carrying shaft of movable electrode A4c within more than 4 mm downwards, and 500 μs.

As a result, vacuum valve A4 opens and movable electrode A4c is maintained in a predetermined position by the opening latch of operating device A7. At this time, as shown in FIG. 8(b), between fixed electrode A4b and movable electrode A4c, a main contact arc is produced by the current interruption.

At this point in time, as the arc voltage of the main contact vacuum arc is low, the short circuit current is limited hardly at all, and as shown in FIG. 9, continues to rise.

As the withstand voltage within the vacuum valve (vacuum container) decreases due to the diffusion vapor caused by the occurrence of the main contact arc, the insulation between control electrode A4d and movable electrode A4c is destroyed by the electric field of capacitor AC2 and a discharge circuit is formed from capacitor AC2 through reactor AL2, movable electrode A4c and fixed electrode A4b and returning to capacitor AC2.

In this discharge circuit, together with the flow (time t 3) of the second LC resonance current of wave height value 20 kA and 1600 Hz determined by the reactor AL2 and capacitor AC2, the second LC resonance current as shown in FIG. 8 (c) and FIG. 9 is superimposed on the short circuit current flowing between fixed electrode A4b and movable electrode A4c.

As the wave height value of this LC resonance current is larger than the short circuit current and the frequency is extremely high, in the summation of the current flowing between fixed electrode A4b and movable electrode A4c, as shown in FIG. 9, during a short time, a zero timing (current zero point) occurs (time t 4) and the arc( that is to say, the arc current) between fixed electrode A4b and movable electrode A4c is interrupted.

Due to the disappearance of the arc between fixed electrode A4b and movable electrode A4c, the short circuit current commutates to capacitor AC2 side, and at the same time as being current limited by the combined impedance of capacitor AC2 and reactor AL2, continues to flow to the short circuit accident point through control electrode A4d and movable electrode A4c. At this time, control contact arc is formed between control electrode A4d and movable electrode A4c, however, as a current zero point occurs by the transient oscillation of the frequency determined by capacitor AC2 and inductance AL2 and circuit inductance not illustrated, control contact arc is interrupted immediately following time t 4.

As this simple string of operations is completed within several hundreds of a μs, the short circuit current does not rise to a maximum value, and is current limited and interrupted at a predetermined value.

According to the embodiments described above, excess current detection apparatus A5 detects the current flowing between power source 1 and load A2, and when this detection result exceeds the predetermined value instantly turns ON thyristor switch A8 for a predetermined time, and when thyristor switch A8 is in an ON state, LC resonance current flows within the separating closed circuit, extending from one end of the electromagnetic repulsion coil A9 via the first capacitor AC1 and the first reactor AL1 to the other end of the electromagnetic repulsion coil A9, and electromagnetic repulsion coil A9 produces a magnetic field in the direction in which movable electrode A4c separates from fixed electrode A4b by excitation caused by this LC resonance current.

As movable electrode A4c separates from fixed electrode A4b, it is possible to separate movable electrode A4c and fixed electrode A4b from each other swiftly and with certainty.

Also, a large current limiting effect is obtained by the compound impedance of the second capacitor AC2 and the second reactor AL2 after vacuum valve A4 is in an OFF state, furthermore, by making vacuum valve A4 a fundamental component, it is possible to reduce steady loss caused by the current limiting component, and can be applied to a high voltage heavy current circuit, and yet furthermore, as it does not employ the method of providing extra current limiting components, it has been possible to achieve compactness and low cost.

Furthermore, as the steady state current flows through the vacuum valve, it is possible to feed the load without causing current carrying loss and voltage decrease. Namely by making the vacuum valve 4 a fundamental component, it is possible to apply it to current limiting breaking devices of high voltage heavy current circuits and supply at a low cost.

Also, as the accident current is detected quickly, it is possible to quickly limit and interrupt the accident current by superimposing a high frequency current from capacitor AC2 onto the accident current while the accident current value is still sufficiently small, enabling the design circuits with a low electromagnetic force and short time resistance capacity in regard to accident currents, and as a result, enabling the free linking between circuits, reducing the cost and increasing the compactness of breaking apparatus, cables and other electric power apparatus.

Also, not limited to AC circuits, as it is also possible to apply the same current limiting breaking operations to DC circuits, it has the merit of being able to be applied to a wide range of uses.

Figure 10:
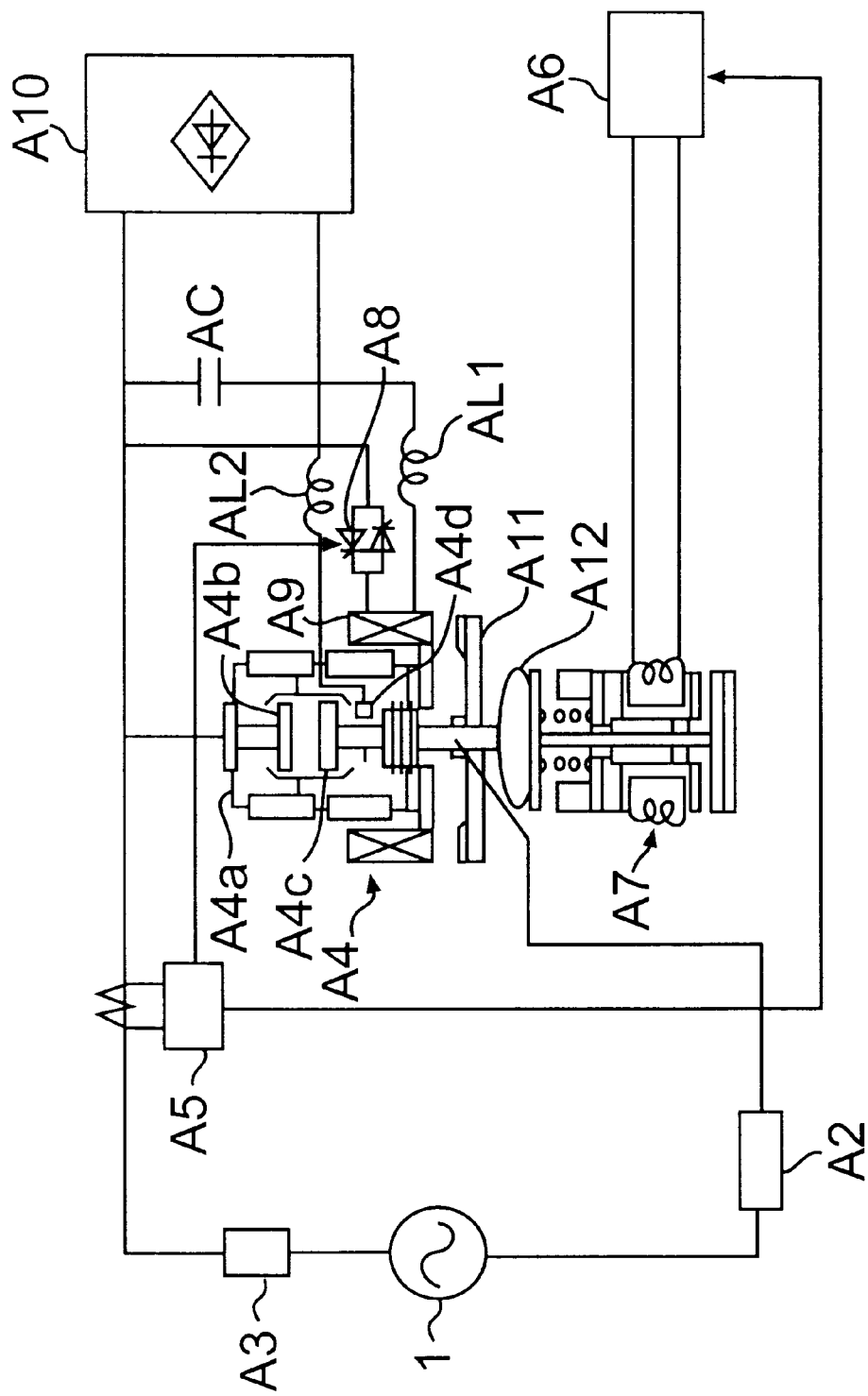
FIG. 10 is a block diagram showing the construction of the high voltage heavy current circuit applied to the current limiting breaking device concerning a fourth embodiment of the present invention.

FIG. 10 is a block diagram showing the construction of a high voltage heavy current circuit with an applied current limiting breaking device relating to the fourth embodiment of the present invention. Detailed explanations have been omitted for the same parts with the same notations as FIG. 7, and here only different parts are discussed. Furthermore, repeated explanations have been similarly omitted for the following embodiments.

That is to say, the present embodiment in FIG. 7 is constructed so that capacitors AC1 and AC2 have been combined into one.

In the previous embodiment, capacitors AC1 and AC2 are each charged and each uses its own circuit, however, in the present embodiment, following the rapid opening of the movable electrode by an electromagnetic coil driven only by one capacitor AC, a high frequency current from via the control electrode is superimposed on the short circuit current.

Even with the above construction, in addition to the same effects of the third embodiment, it is possible to achieve a simplification of the circuit.

Figure 11:
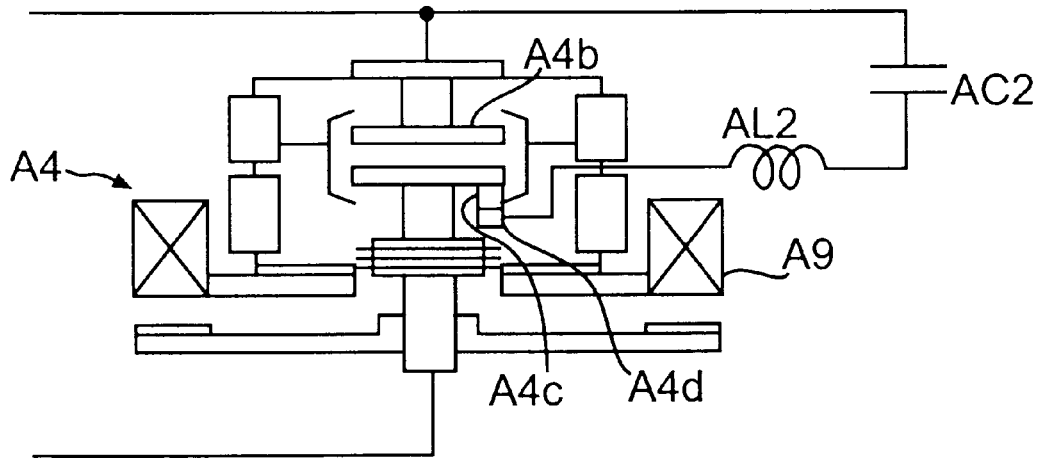
FIG. 11 is a block diagram showing the vacuum valve and a peripheral construction of the current limiting breaking device relating to a fifth embodiment of the present invention.

FIG. 11 is a block diagram showing the construction of the vacuum valve of the current limiting breaking device related to the fifth embodiment of the present invention.

In the present embodiment, the control electrode of the vacuum valve in FIG. 7 is changed from a floating system to a contact system.

In this system, up to the detection of the excess current and the driving of the electromagnetic repulsion coil A9, and rapid opening of the movable electrode A4c of vacuum valve A4 is the same as the third embodiment, however, there is a difference in that by opening movable electrode A4c, movable electrode A4c and control electrode A4d mechanically connect creating an electric circuit.

The merit of this system is that by connecting control electrode A4d and movable electrode A4c it is possible to superimpose the high frequency current from capacitor AC2 onto the short circuit current at a point where movable electrode A4c is exactly at the prescribed distance from fixed electrode A4b.

Conversely, as it becomes not possible to interrupt the current limited short circuit current in the vacuum valve A4, a breaker apparatus becomes indispensable to interrupt the current limited short circuit current.

As described above, according to the present embodiment, in addition to the effects of the features of the third embodiment, as for the vacuum valve A4, as movable electrode A4c and control electrode A4d mechanically connect when in an open state, it is possible to superimpose the high frequency current from capacitor AC2 onto the short circuit current at a point where movable electrode A4c is exactly at the predescribed distance from fixed electrode A4b.

Figure 12:
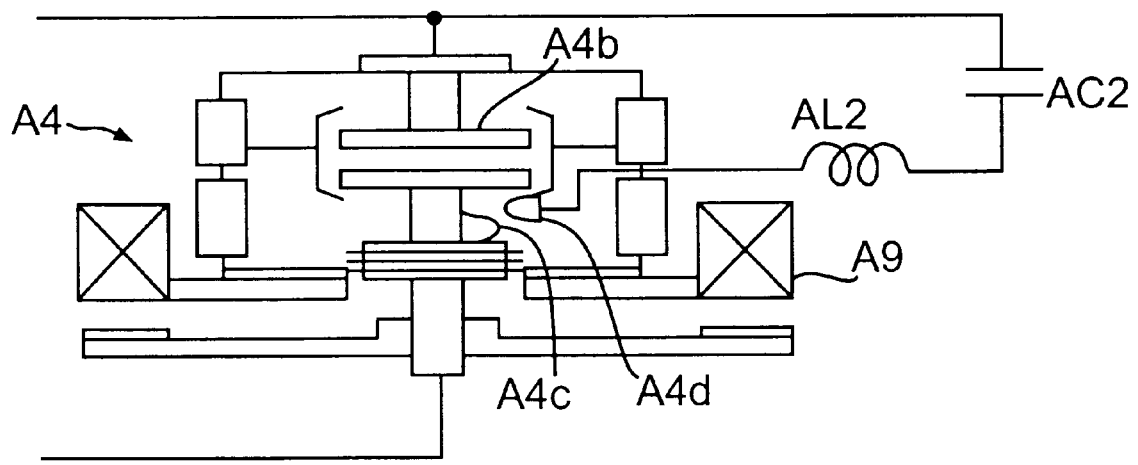
FIG. 12 is a block diagram showing the vacuum valve and the peripheral construction of the current limiting breaking device relating to a sixth embodiment of the present invention.

FIG. 12 is a block drawing showing the construction of the vacuum valve of the current limiting breaking device relating to the features of the sixth embodiment of the present invention.

The present embodiment as shown in FIG. 12 is constructed so that in the process of opening movable electrode A4c within vacuum valve A4, movable electrode A4c separates from electrode A4c an instant after electrically contacting with control electrode A4d.

The merit of this system is, differing from the fifth embodiment, the ability to interrupt the current limited short circuit current.

That is to say, according to the above construction, the short circuit current commutates to the capacitor AC2 side due to the instantaneous contact of movable electrode A4c and control electrode A4d, interrupting the arc current between fixed electrode A4b and movable electrode A4c. After this, an arc occurs between control electrode A4d and movable electrode A4c caused by the commutated short circuit current when control electrode A4d and movable electrode A4c separate, however, as a current zero point occurs due to the oscillation of the circuit current, the vacuum valve A4 is interrupted.

According to the present embodiment discussed above, in addition to the effects of the features of the third embodiment, as for the vacuum valve, when a transition is made from a closed state to an open state, as movable electrode A4c and control electrode A4d separate after instantaneously connecting, the short circuit current commutates to the capacitor side due to the instantaneous connection between movable electrode A4c and control electrode A4d, and the arc current between fixed electrode A4b and movable electrode A4c is interrupted. Next, when control electrode A4d and movable electrode A4c separate after an arc occurs between control electrode A4d and movable electrode A4c as this arc is extinguished by a current zero point, it is possible to make the vacuum valve A4 into an interrupted state.

Figure 13:
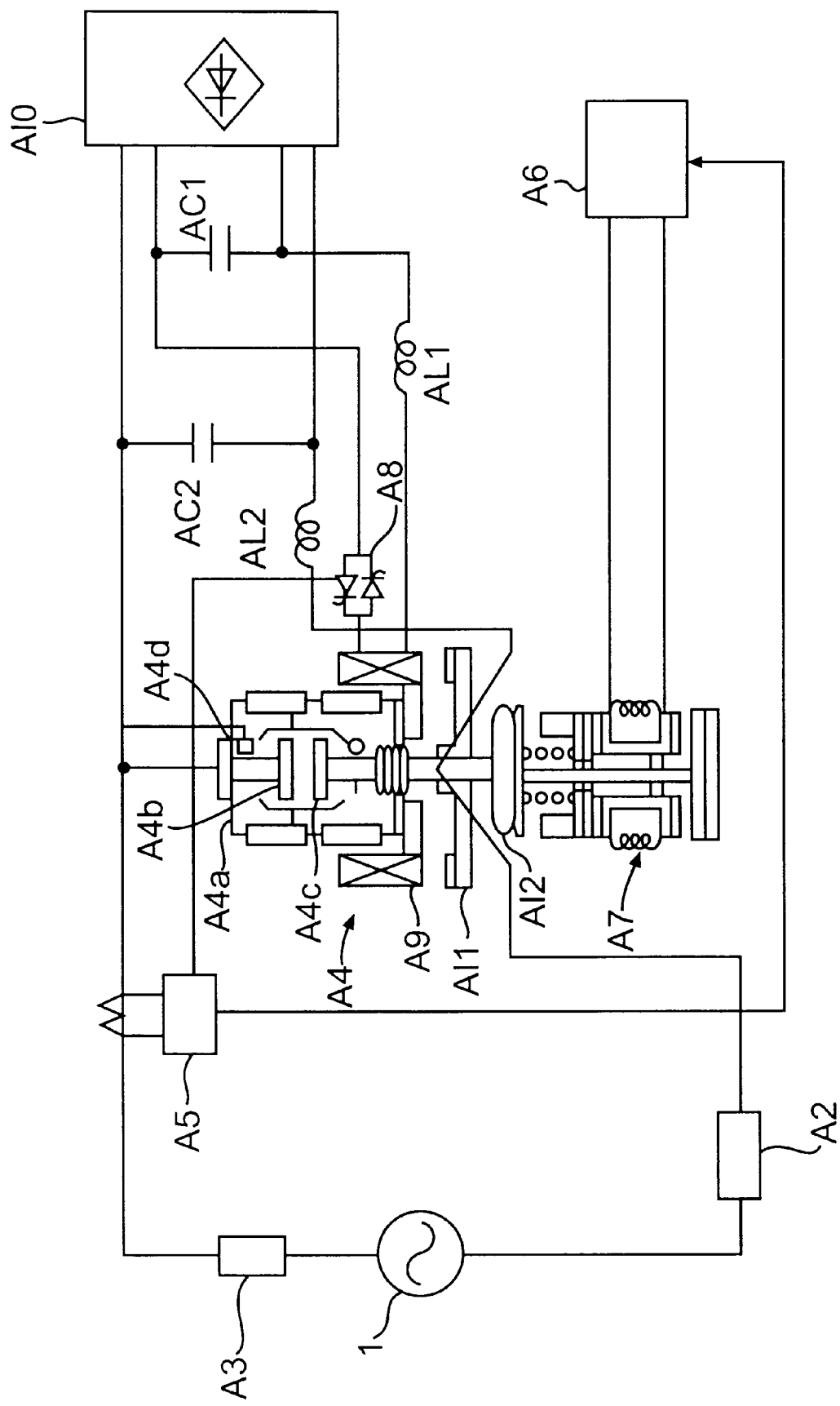
FIG. 13 is a block diagram showing a modification of the third embodiment relating to the present invention.
Figure 14A:
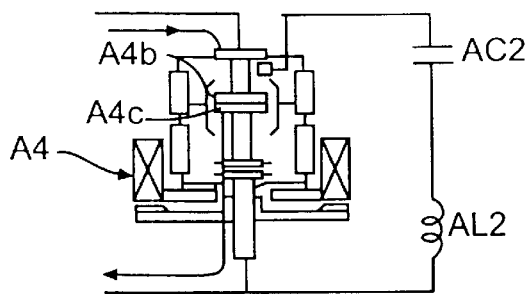
FIG. 14 is a block diagram for the purpose of explaining the operation of the same deformation.
Figure 14B:
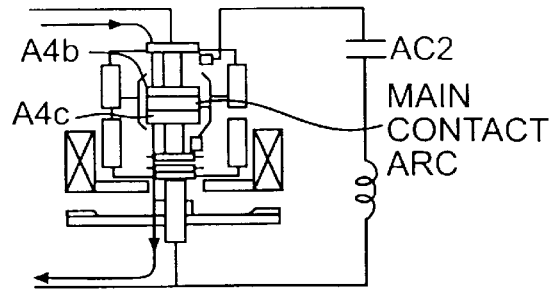
Figure 14C:
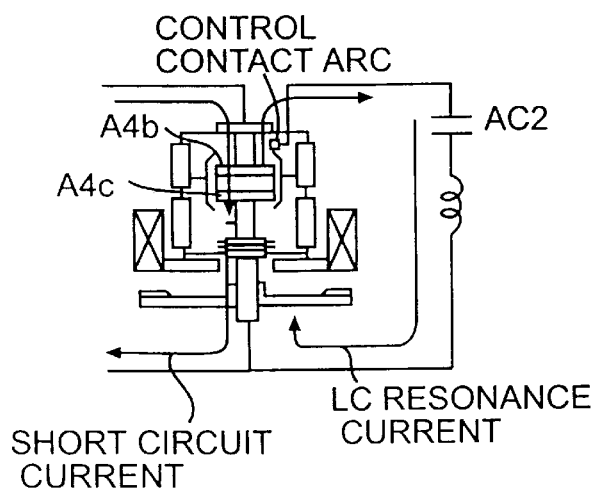
Figure 14D:
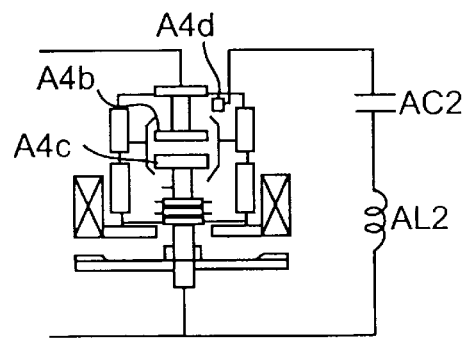
Figure 15:
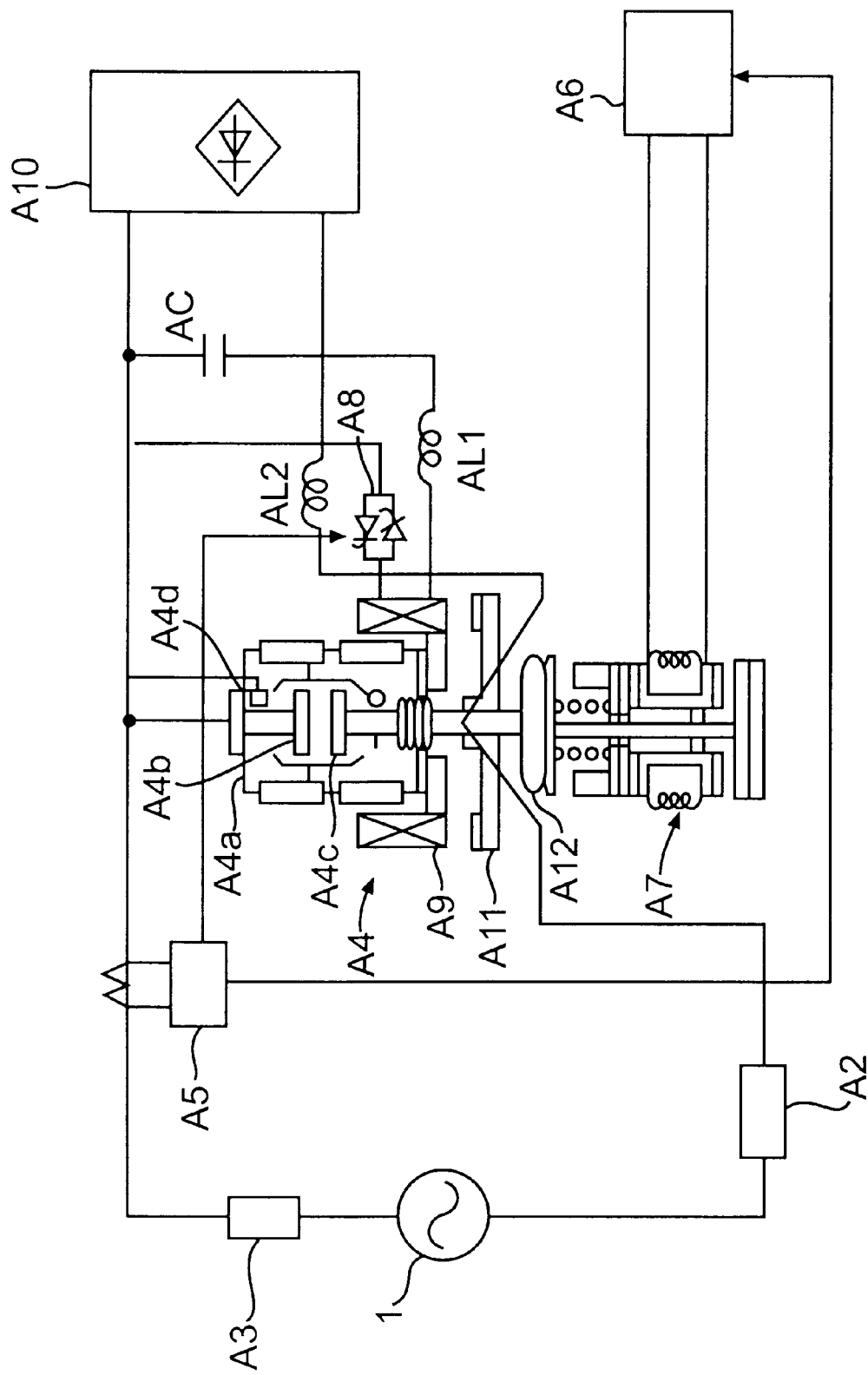
FIG. 15 is a block diagram showing the modification of the forth embodiment relating to the present invention.

Furthermore an explanation has been given in the case where the aforementioned embodiments are provided with control electrode A4d on the movable electrode A4c side, however, not restricted to this, as shown in FIG. 13 through FIG. 15, even in a construction where the control electrode A4d is provided on the fixed electrode A4b side, the execution is the same as the present invention and it is possible to obtain the same results.

As explained above, according to the present invention, a first switch which is normally maintained in a closed state opens when an accident current rises, is connected in series between a power source and a load, and as the aforementioned first switch is connected in parallel to a serially connected circuit of a second switch, which is controlled to close almost simultaneously with the opening of the aforesaid first switch and a capacitor charged with a predetermined electric capacity by a normally random voltage, it is possible to obtain a large current limiting effect as the accident current is current limited at a predetermined value by a predetermined electric capacity capacitor before it rises above a predetermined value. Also, since the current limiting component capacitor is connected in series to the second switch in a normally open state, steady loss caused by the current limiting component does not occur as it is connected in parallel with the first switch. Therefore, in addition to being applicable to high voltage heavy current circuits it is possible to make devices more compact and reduce costs.

Also, according to the present invention, as the aforementioned first switch and the aforementioned second switch can be a vacuum valve respectively, easy application to high voltage and heavy current circuits is possible.

Furthermore, according to the present invention, as the aforementioned first switch can be a vacuum valve and the aforementioned second switch can be an air breaking switch, by making the current limited current flowing second switch an air breaking switch, further cost reduction can be achieved as the manual operation device when using a vacuum valve is not necessary.

Also, furthermore, according to the present invention, as the aforementioned first switch can be a vacuum valve and the said second switch can be a trigger gap, by making the limited current flowing second switch an extremely rapidly responding trigger gap, it is possible to limit the accident current within a shorter time up to a predetermined value. Therefore, in addition to the effects of the aforementioned invention it is possible to obtain an even larger current limiting effect.

Yet further, according to the present invention, an even larger current limiting effect is obtained by the combined impedance of the capacitor and the arc extinguishing reactor after the vacuum valve is in an OFF state. This makes application possible to high voltage, heavy current circuits and increased compactness and reduced costs can be obtained as extra current limiting components are not provided.

Obviously, numerous additional modifications and variations of the present invention are possible in light of the above teachings. It is therefore to be understood that within the scope of the appended claims, the invention may be practiced otherwise than as specially described herein.

What is claimed as new and desired to be secured by Letters Patent of the United States is:

1. A current limiting breaking device connected in series between a power source and a load, which detects a buildup of an accident electric current and limits said current and interrupts said current before it rises, comprising:

a vacuum valve having a fixed electrode and a movable electrode connected between said power source and said load, and also having a control electrode arranged having an insulation distance close to said movable electrode;

a capacitor charged by an arbitrary voltage provided within an arc extinguishing closed circuit extending from the control electrode of said vacuum valve to said fixed electrode; and an arc extinguishing reactor connected in series to said capacitor within said arc extinguishing closed circuit.

2. A current limiting breaking device connected in series between a power source and a load, which detects a buildup of an accident electric current and limits said current and interrupts said current before it rises, comprising:

a vacuum valve having a fixed electrode and a movable electrode connected between said power source and said load, and also having a control electrode arranged having an insulation distance close to said fixed electrode;

a capacitor normally charged with an arbitrary voltage provided within an arc extinguishing closed circuit extending from the control electrode of said vacuum valve to said fixed electrode; and an arc extinguishing reactor connected in series to said capacitor within said arc extinguishing circuit.

3. The current limiting breaking device according to claim 1 or claim 2, further comprising:

an electromagnetic repulsion coil producing a magnetic field by excitation in the direction said movable electrode separates from said fixed electrode, and provided with said vacuum valve;

a thyristor switch connected in series to said capacitor within a separating closed circuit extending from one end of said electromagnetic repulsion coil via said capacitor to the other end of said electromagnetic coil;

a separating reactor connected in series to said capacitor within said separating closed circuit; and an excess current detection apparatus for detecting currents flowing between said power source and said load, and for instantly turning on said thyristor switch for a predetermined period when the detection results exceed a predetermined value.

4. The current limiting breaking device according to claim 1, wherein:

said movable electrode and said control electrode connect mechanically when said vacuum valve is in an open state.

5. The current limiting breaking device according to claim 1, wherein:

said movable electrode and said control electrode separate after instantaneously connecting when said vacuum valve moves from a closed state to an open state.

* * * * *

UNITED STATES PATENT AND TRADEMARK OFFICE
CERTIFICATE OF CORRECTION

PATENT NO. : 6,097,246
DATED : August 1, 2000
INVENTOR(S) : Kazuyuki TSURUNAGA et al.

It is certified that error appears in the above-identified patent and that said Letters Patent is hereby corrected as shown below:

Title Page, In the Title, after "CURRENT LIMITING BREAKING DEVICE" delete "USING ELECTROMAGNETIC REPULSION COIL".

Signed and Sealed this

Seventeenth Day of April, 2001

Attest:

NICHOLAS P. GODICI

*Attesting Officer*   *Acting Director of the United States Patent and Trademark Office*